Patented Apr. 23, 1929.

1,710,636

UNITED STATES PATENT OFFICE.

WILHELM GLUUD AND BERNHARD LÖPMANN, OF DORTMUND-EVING, GERMANY.

PROCESS FOR MANUFACTURING SODIUM BICARBONATE AND AMMONIUM CHLORIDE.

No Drawing. Application filed January 10, 1925, Serial No. 1,628, and in Germany February 21, 1924.

Our invention relates to the production of bicarbonate of sodium, ammonium chloride being recovered as a by-product. It is an object of our invention to improve the process of preparing bicarbonate of sodium by acting bicarbonate of ammonium or carbonic acid and ammonia on sodium chloride in such manner as to obtain a substantially quantitative yield of sodium bicarbonate substantially free from ammonium chloride, this latter salt being also recovered in substantially pure state.

Our process utilizes the well known step of producing sodium bicarbonate and ammonium chloride by acting on a solution containing the bicarbonates and chlorides of sodium and ammonium with carbonic acid and ammonia or ammonium bicarbonate and with sodium chloride. According to our invention, instead of using a plain solution, as aforesaid, we cause the reaction to proceed in a solution which contains besides the bicarbonates and chlorides also a readily soluble auxiliary salt (or a plurality of such salts) of one of the two bases (sodium and ammonium) and of an acid other than hydrochloric and carbonic acid. In consequence of the presence in the solution of the bicarbonates and chlorides of a readily soluble auxiliary sodium or ammonium salt of another acid we are enabled to operate in a saturated solution of $NH_4Cl$ without any danger of the reaction $NaCl + NH_4HCO_3 = NaHCO_3 + NH_4Cl$ occurring in a reverse sense, as is ordinarily the case if operating in saturated solutions. For the auxiliary salt of great solubility influences the conditions of dissolution of the other salts in such manner as to reduce the solubility of the ammonium chloride, part of the water available for dissolution being saturated with the auxiliary salt, and on the other hand the conditions under which ammonium chloride can be formed are materially changed in such manner as to prevent its being precipitated together with sodium bicarbonate. By operating in a saturated solution of $NH_4Cl$ we obtain the advantage that the newly formed ammonium chloride will separate at once, in contradistinction to the processes hitherto known which labour under the difficulty of getting the ammonium chloride to separate. In consequence of this favourable influence we are enabled to continuously obtain from one and the same solution bicarbonate of sodium and ammonium chloride by alternately adding bicarbonate of ammonium (or carbonic acid gas and ammonia gas) and sodium chloride, the products being obtained in substantially pure state without any artificial cooling and any evaporation being required.

Amongst the auxiliary salts answering our purpose we mention by way of example the sodium or ammonium nitrates, nitrites, formates, acetates, sulfates, sulfocyanates and thiosulfates, including the mixture of ammonium salts contained in the masses resulting in the purification of coal gas.

The following equations illustrate the probable course of the reactions occurring during the process, if sodium nitrate is used as auxiliary salt:

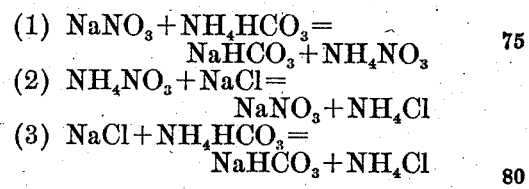

By replacing the nitrate ion by X, the equations read as follows:

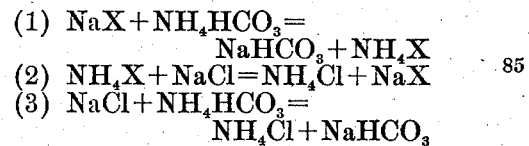

In these latter equations X stands for the acid ion of one or several of the salts above mentioned or other salts answering the same purpose, which are highly soluble in water and whose presence in the solution causes sodium bicarbonate to be obtained in accordance with equation (1), while, if no such auxiliary salt were present in the solution saturated with $NH_4Cl$ there would be formed $NaHCO_3$ according to the equation (3) and owing to the high contents of $NH_4Cl$ the reaction would take place in the reverse sense.

As shown by the equations, the formation of sodium bicarbonate takes place in two phases according to the equation (1) on the one hand and according to the equation (3) on the other hand, both phases occurring simultaneously in the same solution. Inasmuch as the solution always remains saturated with ammonium chloride, the ammonium chloride forming according to the equation (2) will be precipitated from the solution.

On the other hand the auxiliary salt, while playing an active part in the reaction, as shown by the equations (1) and (2), is nevertheless constantly reconstructed during the reaction and therefore the quantity of acid ions other than hydrochloric and carbonic acid once added to the solution will remain constant indefinitely. The auxiliary salt thus acts substantially after the manner of a catalyst, if this term is understood in a broad sense.

In practising our invention, we may for instance proceed as follows:

Example 1.

3850 grams ammonium nitrate are dissolved in 7 litres water and 6 litres of this solution are stirred during 3 hours at 30° C. with 3.6 kilograms sodium chloride. The solution obtained in this manner is saturated with sodium chloride and, in consequence of the reaction proceeding in the solution, contains a considerable quantity of ammonium chloride. After filtration 560 grams bicarbonate of ammonia are added under stirring. The liquid is again filtered for separating the sodium bicarbonate, which is precipitated in the reaction. If now the filtrate freed from sodium bicarbonate is treated with a quantity of finely pulverized sodium chloride which is equivalent to the quantity of the bicarbonate of ammonia previously added, the liquid being stirred during a few hours at about 20° C., ammonium chloride will settle down, which can now be separated from the liquid also and after rinsing with a little water is obtained in substantially pure state. The rinsing water is returned into the main solution, the quantity of which thus remains substantially constant. The reaction can now be gone through repeatedly in the same solution, bicarbonate of ammonia and finely pulverized sodium chloride being alternately added under stirring and the sodium bicarbonate and ammonium chloride, respectively, which settle down, being separated.

As the process proceeds, the yield grows steadily and soon becomes quantitative, while the purity of the products increases.

Obviously, instead of using bicarbonate of ammonia, we may as well introduce into the solution corresponding quantities of ammonia gas and carbonic acid gas.

Example 2.

To 4 litres of a solution containing 20–25 per cent ammonium sulfocyanate and which has been saturated with sodium chloride and ammonium chloride, any undissolved salts being separated by filtration, are added 400 grams ammonium bicarbonate and the mixture is stirred during about 3 hours at about 30° C. The sodium bicarbonate which settles down, is removed by filtration and 290 grams finely pulverized sodium chloride are added to the filtrate the mixture being stirred a few hours at about 20° C. The ammonium chloride which separates out is removed by filtration and the filtrate, which contains sulfocyanate, can be further treated with ammonium bicarbonate or with gaseous ammonia and carbonic acid for the recovery of sodium bicarbonate, and after this product has been removed, with sodium chloride for the recovery of ammonium chloride.

Instead of pure ammonium sulfocyanate we may also use the raw solution containing this salt, which is obtained in the purification of coal gas.

The salts to be treated being mixtures of chlorides and of auxiliary salts, such as nitrates, sulfocyanates and the like, may be selected and mixed in any suitable manner, care being taken, however, to obtain a solution which is saturated with sodium chloride and ammonium chloride. Thus to a saturated solution of sodium chloride may be added as much ammonium chloride as can still be dissolved therein, a fair amount of ammonium nitrate being then added, whereupon the solution is again saturated with sodium chloride. We may, however, also start with a solution containing sodium nitrate or ammonium nitrate, in which the chlorides and bicarbonates have been dissolved to the limits of their solubilities. Any deposits or undissolved salts are preferably removed by filtration. A solution prepared in this manner will be saturated of itself with sodium bicarbonate or ammonium bicarbonate during the process, owing to the treatment with bicarbonate of ammonia, whereby sodium bicarbonate is precipitated.

The advantages of the new process, as set out already, consist in a substantially theoretical yield of sodium bicarbonate and ammonium chloride, no loss of sodium chloride occurring in the reaction owing to the reversal of the reaction being prevented by the presence of the auxiliary salt. We further obtain directly solid ammonium chloride and the operation is a continuous one, only a single solution being substantially required. The process is carried through without any necessity of concentrating the solution or of expelling and recovering ammonia. No artificial cooling is required and practically no loss of auxiliary salt is experienced, the great solubility of these salts allowing them to be washed out altogether and returned into the main solution.

Various changes may be made in the details of the operation and particularly in the proportions of the ingredients present in the solutions used without departing from the invention or sacrificing the advantages thereof.

As mentioned in the beginning, our process can be carried out either with carbonic acid gas and ammonia gas or with bicarbonate of ammonia, and we therefore wish it to be understood that the words "carbonic acid and ammonia", wherever used in the claims, are designed to include bicarbonate of ammonia as an alternative.

The term "auxiliary salt" as used in the claims is intended to designate either a sodium salt or an ammonium salt.

We claim:—

1. The process of producing sodium bicarbonate and ammonium chloride comprising acting first with carbonic acid and ammonia and thereafter with sodium chloride on a solution containing besides the bicarbonates and chlorides of sodium and ammonium a readily soluble auxiliary salt of an acid other than hydrochloric and carbonic acid and recovering from the solution sodium bicarbonate and ammonium chloride.

2. The process of producing sodium bicarbonate and ammonium chloride comprising acting first with carbonic acid and ammonia and thereafter with sodium chloride on a saturated solution of the bicarbonates and chlorides of sodium and ammonium containing a readily soluble auxiliary salt of an acid other than hydrochloric and carbonic acid and recovering from the solution sodium bicarbonate and ammonium chloride.

3. The process of producing sodium bicarbonate and ammonium chloride comprising acting alternately with carbonic acid and ammonia and with sodium chloride on a solution containing besides the bicarbonates and chlorides of sodium and ammonium a readily soluble auxiliary salt of an acid other than hydrochloric and carbonic acid and recovering from the solution sodium bicarbonate and ammonium chloride.

4. The process of producing sodium bicarbonate and ammonium chloride comprising acting first with carbonic acid and ammonia and thereafter with sodium chloride on a solution containing besides the bicarbonates and chlorides of sodium and ammonium readily soluble auxiliary salts of an acid other than hydrochloric and carbonic acid and recovering from the solution sodium bicarbonate and ammonium chloride.

5. The process of producing sodium bicarbonate and ammonium chloride comprising acting first with carbonic acid and ammonia and thereafter with sodium chloride on a solution containing besides the bicarbonates and chlorides of sodium and ammonium a readily soluble auxiliary salt of sulfocyanic acid and recovering from the solution sodium bicarbonate and ammonium chloride.

6. The process of producing sodium bicarbonate and ammonium chloride comprising acting first with carbonic acid and ammonia and thereafter with sodium chloride on a solution containing besides the bicarbonates and chlorides of sodium and ammonium a readily soluble auxiliary salt of an acid other than hydrochloric and carbonic acid, keeping the temperature of the solution, while acting thereon with sodium chloride, lower than while acting thereon with carbonic acid and ammonia and recovering from the solution sodium bicarbonate and ammonium chloride.

7. The process of producing sodium bicarbonate and ammonium chloride comprising acting first with carbonic acid and ammonia and thereafter with sodium chloride on a solution containing besides the bicarbonates and chlorides of sodium and ammonium a readily soluble auxiliary salt of an acid other than hydrochloric and carbonic acid, keeping the temperature of the solution, while acting thereon with sodium chloride, at about 20° C., while acting thereon with carbonic acid and ammonia at about 30° C. and recovering from the solution sodium bicarbonate and ammonium chloride.

8. The process of producing sodium bicarbonate and ammonium chloride comprising acting first with carbonic acid and ammonia and thereafter with a substantially equimolecular quantity of sodium chloride on a solution containing besides the bicarbonates and chlorides of sodium and ammonium a readily soluble auxiliary salt of an acid other than hydrochloric and carbonic acid and recovering from the solution sodium bicarbonate and ammonium chloride.

In testimony whereof we hereunto affix our signatures.

WILHELM GLUUD.
BERNHARD LÖPMANN.